(No Model.)
L. J. HIRT.
CAR WHEEL.
No. 521,587. Patented June 19, 1894.
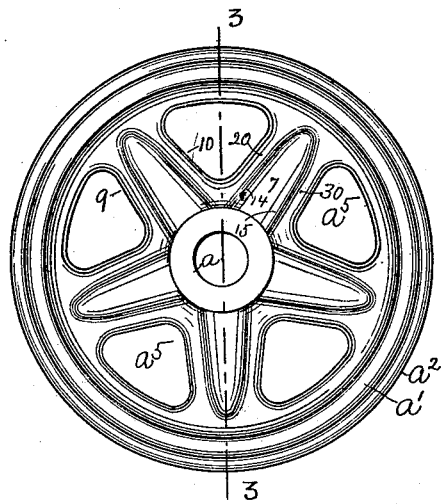
Fig. 1.
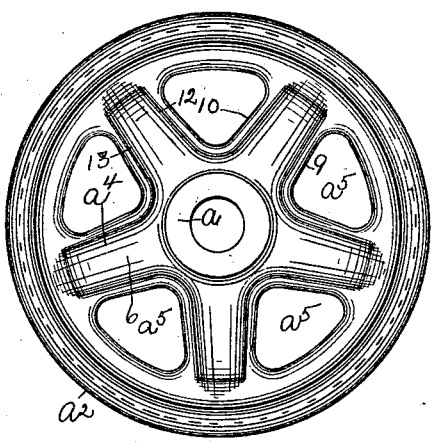
Fig. 2.
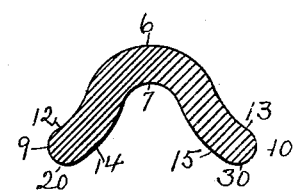
Fig. 4.
Fig. 5.
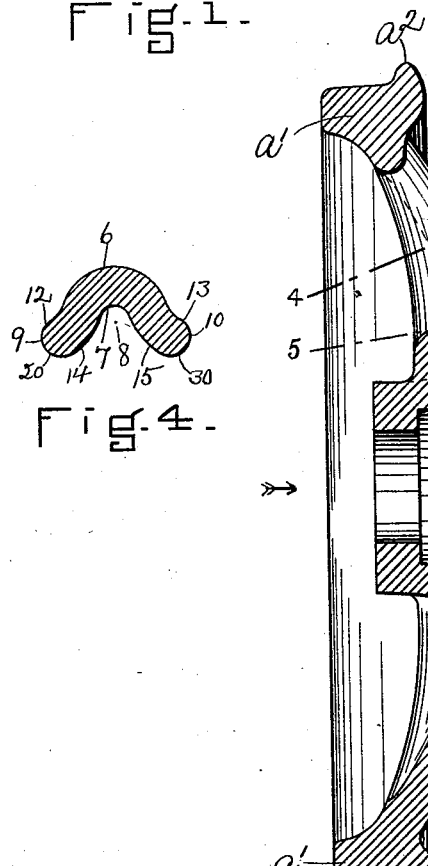
Fig. 3.
WITNESSES.
Matthew M. Blunt.
J. Murphy.
INVENTOR.
Louis J. Hirt
By Jas. H. Churchill
Atty.

UNITED STATES PATENT OFFICE.

LOUIS J. HIRT, OF SOMERVILLE, MASSACHUSETTS.

CAR-WHEEL.

SPECIFICATION forming part of Letters Patent No. 521,587, dated June 19, 1894.

Application filed December 21, 1893. Serial No. 494,274. (No model.)

*To all whom it may concern:*

Be it known that I, LOUIS J. HIRT, residing in Somerville, in the county of Middlesex and State of Massachusetts, have invented an Improvement in Car-Wheels, of which the following description, in connection with the accompanying drawings, is a specification, like letters and numerals on the drawings representing like parts.

This invention relates to car wheels, and has for its object to improve the construction of the same, whereby a lighter, stronger, more elastic and durable wheel may be obtained.

My improved wheel approaches that class commonly known as spoke wheels, in which the hub is united to the rim by a series of spokes or arms, and my present invention relates more particularly to the construction of wheel, whereby the spokes or arms are made of increased strength and elasticity with a minimum amount of metal.

In accordance with my invention, the spokes or arms separated from each other in the wheel by spaces or openings are curved and concaved on their opposite faces and approximate a corrugated effect in the completed wheel, the inner concavity of the spoke or arm being made of such depth as to obtain a substantially uniform thickness of metal throughout the entire arm. The hub of the wheel to which the corrugated arms are attached is preferably located to one side of or out of line with the unflanged side of the rim or tread and substantially in line with the flanged side of the rim or tread, and the convexity and concavity of the arms or spokes project outward from the flanged side of the wheel. These and other features of this invention will be pointed out in the claim at the end of this specification.

Figure 1 is a side elevation of a car wheel embodying this invention, looking in the direction of the arrow in Fig. 3. Fig. 2, is an opposite side elevation of the wheel shown in Fig. 1 looking in a direction opposite to that indicated by the arrow in Fig. 3. Fig. 3, is a diametrical section on the line 3—3, Fig. 1; Fig. 4, a sectional detail on the line 4—4, Fig. 3, through one of the spokes or arms to more clearly show the construction of the same, and Fig. 5, a sectional detail on the line 5—5 through another portion of the spoke or arm to show the uniform thickness of the metal arm.

The car wheel herein shown may be made of cast-iron, steel or other suitable or usual metal, and if desired, the said wheel may be made of cast-iron and be provided with a chilled tread or rim. The car wheel comprises essentially the hub $a$, the rim or tread $a'$ provided with a flange $a^2$ and the curved spokes or arms $a^4$ preferably all cast in one piece and leaving substantially triangular shaped openings $a^5$ between adjacent spokes or arms $a^4$.

In accordance with this invention, the curved spokes or arms $a^4$, herein shown as five in number but which may be of any other desired number, are made of substantially uniform thickness throughout their entire length from the point of juncture with the hub and the point of connection with the rim or tread $a'$, and this result or construction of the curved arms or spokes is best effected by making the arm or spoke convexed on its outer surface as at 6, Figs. 4 and 5, and concaved on its inner surface as at 7 in said figures. The inner and outer rounded or curved surfaces 7—6, are practically made in the arcs of circles having a common center 8, and extend from the hub $a$ to the rim $a'$, each in a single or unbroken curve substantially at right angles to a radial line through the said spoke, and the radius of the circle upon which the outer curved surface 6 is struck, is preferably less than the distance between the walls 9—10 of adjacent spaces or openings $a^5$ in the web of the wheel. The outer curved surface 6 of the corrugated spoke merges into the web forming the walls of the spaces or openings $a^5$, and the inner curved surface 7, which is of materially less radius than the radius of the curve 6, merges into the inner wall of the web of the wheel, and the inner walls of the web merging into or connected with the inner curved surface 7, are made in the arcs of circles of greater radius than the circle upon which the outer wall or web is made.

By reference to Figs. 4 and 5, it will be seen that the outside of the outer wall of the corrugated arm and the portion of the web of which it forms a part, are practically made of three curves, namely, the substantially large center curve and two substantially small curves 12—13, while the inner curved wall of the arm and the walls of the web of which it forms part, are composed of a smaller central curve and two substantially large curves 14—15.

By reference to Figs. 3, 4 and 5, it will be noticed that the arm or spoke is of substantially uniform thickness throughout its entire length and breadth and that the curves 6 and 7 extend unbroken by other curves from the hub to the rim, and that the said curved arm practically forms a corrugated arm, in contradistinction to an arm composed of two curves between the hub and the rim, and also in contradistinction to an arm provided on one face with one or more strengthening ribs; and furthermore, it will be noticed that the convexed and concaved curved surfaces extend from the hub to the rim, and that these curved surfaces of all the spokes practically lie on the same side of a plane substantially through the flange of the wheel and form direct corrugated surfaces in contradistinction to a wheel provided with a plate web formed with alternating direct and reversed connected corrugations.

The wheel herein shown being provided with curved spokes or arms is much lighter than a solid wheel, and by reason of the said spokes or arms being made corrugated or of substantially uniform thickness throughout their length and width, a much stronger and elastic and more durable wheel is obtained at a minimum expense and with a minimum amount of metal.

I prefer to construct the wheel with the hub $a$ out of line with the unflanged side of the rim and beyond the plane of the flanged side, so that the corrugated arms will extend from the rim toward the center of the wheel beyond and out of line with the flanged face of the wheel, as clearly represented in Fig. 3.

The wheel is cast with the hub and corrugated arms upward, and by so doing the metal at the sides of the arms at the points 20, 30, Figs. 4 and 5, cools before the metal forming the curved intermediate portion, and as a result, the metal of the arm shrinks uniformly and is relieved from strain, and as the metal comprising the sides of the arm cools, it draws down or in toward the rim of the wheel, the warmer metal comprising the central portion of the arm, thereby avoiding blow holes and making a stronger arm. By extending the hub outside of the plane of the flanged portion of the rim and connecting the said hub to the rim or tread with curved corrugated arms extending from the hub to the said rim and which project beyond the said plane, greater elasticity is given to the wheel and consequently, it is enabled to resist sudden shocks, thereby avoiding the liability of the wheel breaking.

The hub $a$ of the wheel is preferably provided with an annular groove $c$ to reduce the amount of metal at the base of the arm and thereby avoid the formation of blow holes in the hub.

I claim—

A car wheel composed of a hub, rim, and spokes separated to leave openings and corrugated in the direction of their length, the outer and inner faces of the said spokes having the curves 6, 7, respectively, substantially at right angles to a radial line through the said spoke and both curves extending from the hub to the rim in unbroken lines, to obtain a corrugated spoke of uniform thickness from the hub to the rim, substantially as described.

In testimony whereof I have signed my name to this specification in the presence of two subscribing witnesses.

LOUIS J. HIRT.

Witnesses:
JAS. H. CHURCHILL,
J. MURPHY.